United States Patent
Suarez

(10) Patent No.: US 8,161,253 B2
(45) Date of Patent: Apr. 17, 2012

(54) MAINTENANCE OF VALID VOLUME TABLE OF CONTENTS

(75) Inventor: Jeffrey R. Suarez, Tucson, AZ (US)

(73) Assignee: International Business Machine Corporation, Armonk, NY (US)

( * ) Notice: Subject to any disclaimer, the term of this patent is extended or adjusted under 35 U.S.C. 154(b) by 871 days.

(21) Appl. No.: 11/668,936

(22) Filed: Jan. 30, 2007

(65) Prior Publication Data

US 2008/0183960 A1   Jul. 31, 2008

(51) Int. Cl.
*G06F 12/00* (2006.01)
(52) U.S. Cl. ........... 711/162; 711/114; 711/E12.103
(58) Field of Classification Search .......... 711/114, 711/162
See application file for complete search history.

(56) References Cited

U.S. PATENT DOCUMENTS

| | | | |
|---|---|---|---|
| 5,193,184 A * | 3/1993 | Belsan et al. | ........... 711/4 |
| 6,119,208 A | 9/2000 | White et al. | |
| 6,189,015 B1 | 2/2001 | Reed et al. | |
| 6,732,244 B2 | 5/2004 | Ashton et al. | |
| 6,772,302 B1 | 8/2004 | Thompson | |
| 7,032,090 B2 | 4/2006 | Hulsey | |
| 2004/0205311 A1 * | 10/2004 | Hulsey | ........... 711/162 |
| 2006/0179261 A1 | 8/2006 | Rajan | |

OTHER PUBLICATIONS

Leach, P.J. et al., The File System of an Integrated Local Network, ACM Digital Library; Mar. 1985.
Mikhailov, M. et al., Evaluating a New Approach to Strong Web Cache Consistency with Snapshots of Collected Content, ACM Digital Library, May 2003.

* cited by examiner

*Primary Examiner* — Reginald Bragdon
*Assistant Examiner* — Larry Mackall
(74) *Attorney, Agent, or Firm* — Griffiths & Seaton, PLLC

(57) ABSTRACT

A method maintains a valid volume table of contents (VTOC) written to in a fast replication relationship. A fast replication query is issued to a track in which the volume table of contents (VTOC) resides. If the query determines that a background copy is in progress, a volume having the track is designated as unusable. An apparatus maintains a valid volume table of contents (VTOC) written to in a fast replication relationship. A controller issues a fast replication query to a track in which the volume table of contents (VTOC) resides. If the query determines that a background copy is in process, a volume having the track is designated as unusable.

20 Claims, 6 Drawing Sheets

MAINTENANCE OF VALID VOLUME TABLE OF CONTENTS

BACKGROUND OF THE INVENTION

1. Field of the Invention

The present invention relates in general to computers, and more particularly to a system and method of determining whether a volume table of contents (VTOC) is valid prior to withdrawing the volume in a fast replication relationship.

2. Description of the Prior Art

Data processing systems often work with large amounts of data and require mechanisms to manage the storage and archiving of that data. For example, transaction processing systems typically access large databases and log results such as transaction records at a very high rate. The ability to quickly and reliably copy data from one storage area to another enables the deployment of efficient and reliable high-performance processing applications and systems.

In addition to increased performance, fast replication capable systems simplify the code complexity of I/O intensive processes such as those conducted on large mainframe systems and the like. System performance may also be increased in that support for fast replication operations may be provided by low-level drivers and devices that are optimized for performance.

Fast replication capable systems preferably support multiple concurrent fast replication data transfers. Since the data transfer may be deferred indefinitely, the act of initiating a fast replication operation between a source and a target volume is often referred to as "establishing a fast replication relationship." Likewise, canceling a pending fast replication transfer may be referred to as "withdrawing a fast replication relationship."

Without support for fast replication relationships, conducting a point-in-time copy often requires that a system suspend all tasks that access a source and/or target device. Since many systems do not have explicit knowledge of the devices that will be accessed by each task, those systems require suspension of all tasks except for the task conducting the actual fast replication operations. Suspension of the various tasks or processes in order to conduct fast replication operations greatly reduces the performance of multi-tasking systems.

One challenge of fast replication capable systems concerns the integrity of the volume table of contents (VTOC) when a volume is withdrawn from a fast replication relationship. The possibility exists that, upon a withdrawal, either on an intentional or inadvertent basis, the VTOC contains invalid data. The VTOC can contain invalid data if, at the time data was being physically written to the VTOC using a fast replication method, the volume was withdrawn and the method was terminated midstream. Such an intentional or inadvertent withdrawal can be detrimental to applications or programs that later attempt to use this volume.

SUMMARY OF THE INVENTION

Therefore, what is needed are methods and apparatus for maintaining, managing, and evaluating the VTOC in respective volumes to ensure that the VTOC contains valid information. Such methods and apparatus would preferably operate in a manner that is efficient, reliable, and straightforward to implement.

In one embodiment, the present invention is a method for maintaining a valid volume table of contents (VTOC) written to in a fast replication relationship, comprising issuing a fast replication query to a track in which the volume table of contents (VTOC) resides, wherein if the query determines that a background copy is in progress, a volume having the track is designated as unusable.

In another embodiment, the present invention is an apparatus for maintaining a valid volume table of contents (VTOC) written to in a fast replication relationship, comprising a controller which issues a fast replication query to a track in which the volume table of contents (VTOC) resides, wherein if the query determines that a background copy is in process, a volume having the track is designated as unusable.

In still another embodiment, the present invention is an article of manufacture including code for maintaining a valid volume table of contents (VTOC) written to in a fast replication relationship, wherein the code is capable of causing operations to be performed comprising issuing a fast replication query to a track in which the volume table of contents (VTOC) resides, wherein if the query determines that a background copy is in progress, a volume having the track is designated as unusable.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
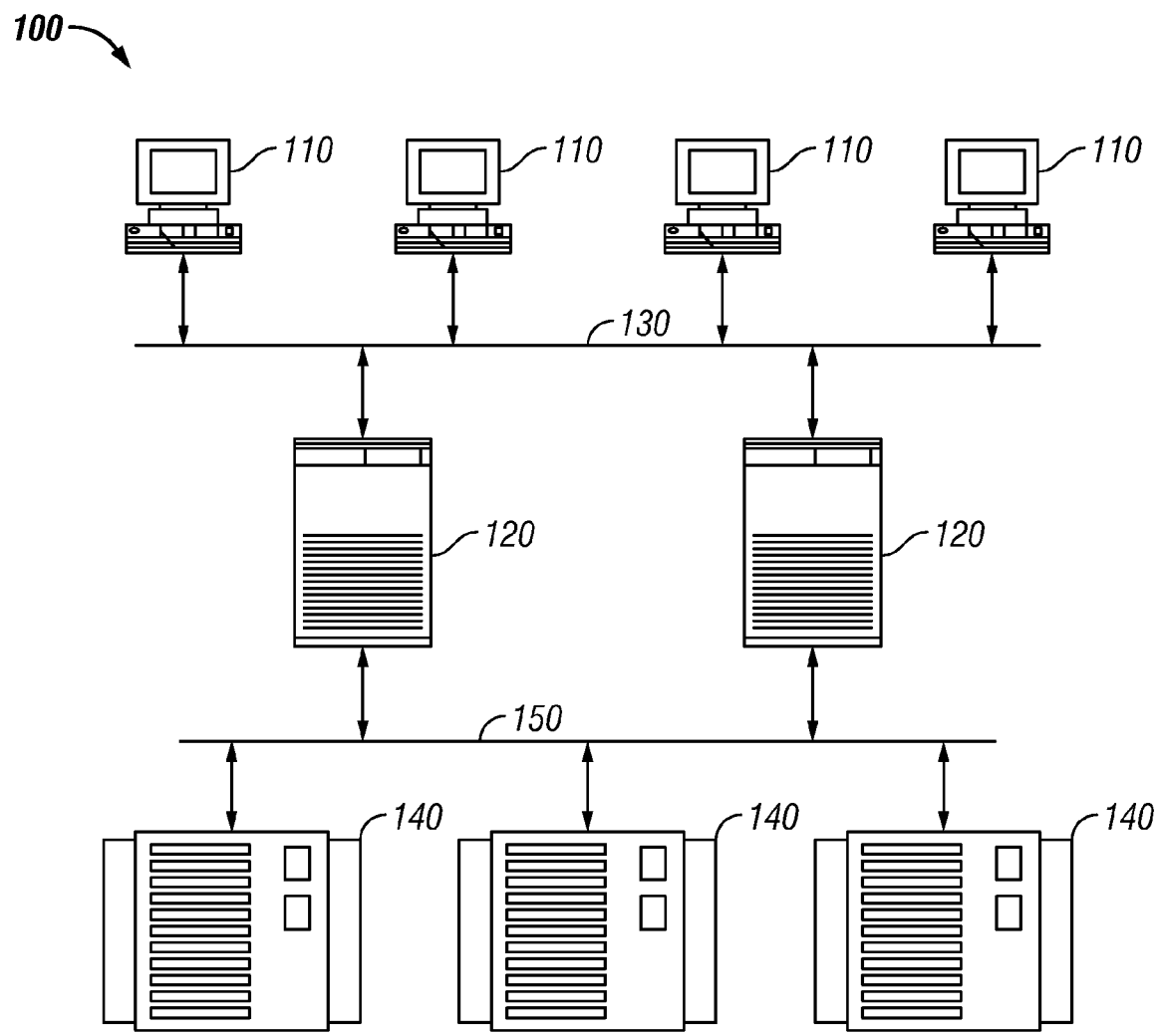
FIG. 1 is a block diagram illustrating a network system representative of the environment wherein the present invention may be deployed.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Fast replication techniques such as IBM's Flashcopy™ technology have been developed in response to the need for efficient copying mechanisms within high-performance processing systems. A fast replication operation gives the appearance of an instantaneous copy, while the actual transfer of data is conducted as a background process, or is deferred until the data to be copied is about to be overwritten. With fast replication techniques, applications may conduct data snapshots (point-in-time copies) and continue processing rather than suspending operation while the data transfers occur.

Referring to FIG. 1, a network system 100 is representative of the environment wherein the present invention may be deployed. The depicted network system 100 includes workstations 110 and servers 120 interconnected via a network 130. The network 130 may comprise a local area network and/or a wide area network.

The depicted network system 100 also includes one or more storage arrays 140 interconnected with the servers 120 via a storage network 150. In one embodiment, the servers 120 are mainframe computers configured to conduct high bandwidth I/O with the storage arrays 140.

Figure 2A:
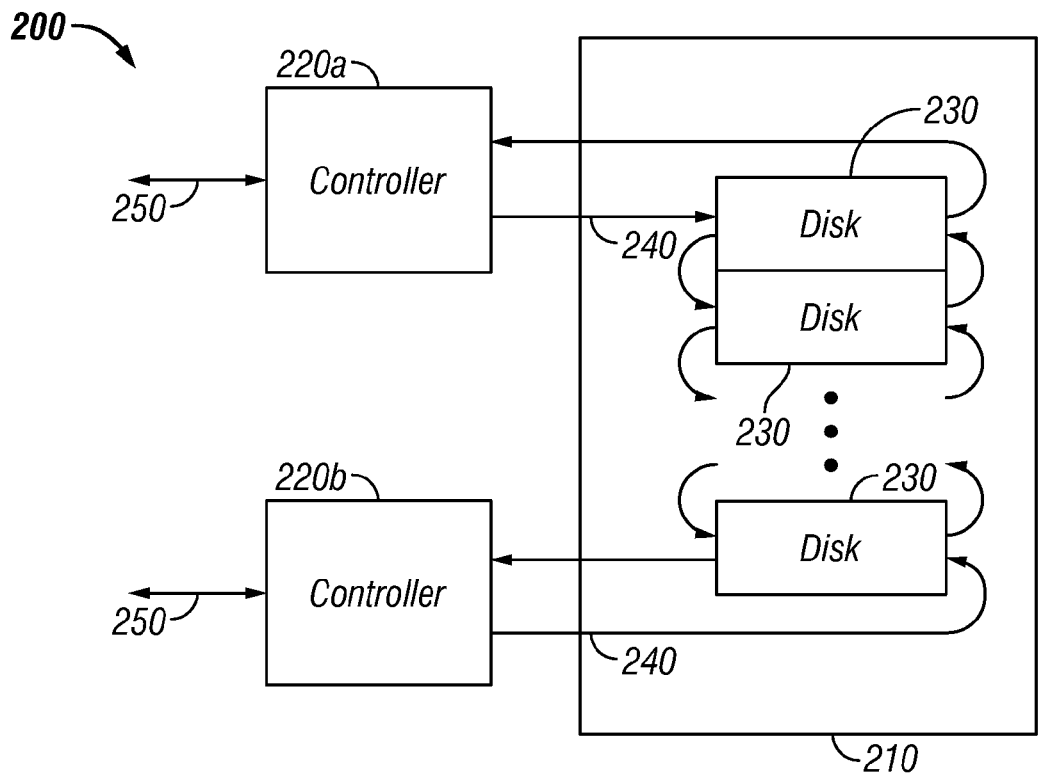
FIG. 2a is a block diagram illustrating a storage array representative of the environment wherein the present invention may be deployed.

FIG. 2a is a schematic block diagram of a storage sub-system 200. The storage sub-system 200 is a representative example of sub-systems wherein the present invention may be deployed and is one example of the storage array 140 depicted in FIG. 1. The storage sub-system 200 includes a storage array 210 and one or more controllers 220. In one example, the storage array 210 may include a redundant array of independent disks (RAID) configuration. The storage sub-system 200 may include a plurality of controller modules 220 that achieve increased reliability through redundancy. Additionally, the storage array 210 may also achieve increased reliability by interconnecting multiple storage devices 230 via an array loop 240.

In the depicted embodiment, the storage devices 230 are interconnected with an array loop 240. The array loop 240 also interconnects the controllers 220 with the storage array The array loop 240 circulates communications in both directions to increase reliability and throughput. In one embodiment, the array loops 240 are point-to-point loops such as those defined by the fibre channel standard.

In the depicted embodiment, the controllers 220 each support a host connection 250. The controllers 220 receive access requests via the host connection 250 and service those requests by transferring blocks of data to and from the storage array 210. The blocks of data that are transferred to the storage array 210 may be redundantly encoded to permit error detection and data recovery in the event of failure of one of the storage devices 230. Typically, the controllers 220 organize the storage devices 230 in a redundant manner and present one or more volumes for use by a one or more servers or hosts such as those depicted in FIG. 1.

In addition to connection and data redundancy, the controllers 220 may support various types of fast replication operations. Fast replication operations provide the appearance of an instant copy between a source volume and a target volume within a storage sub-system such as the storage sub-system 200. Fast replication operations conduct data transfers from the source volume to the target volume at the convenience of the storage sub-system 200 without halting access to the source or target volumes by an external device, such as a host or server.

Figure 2B:
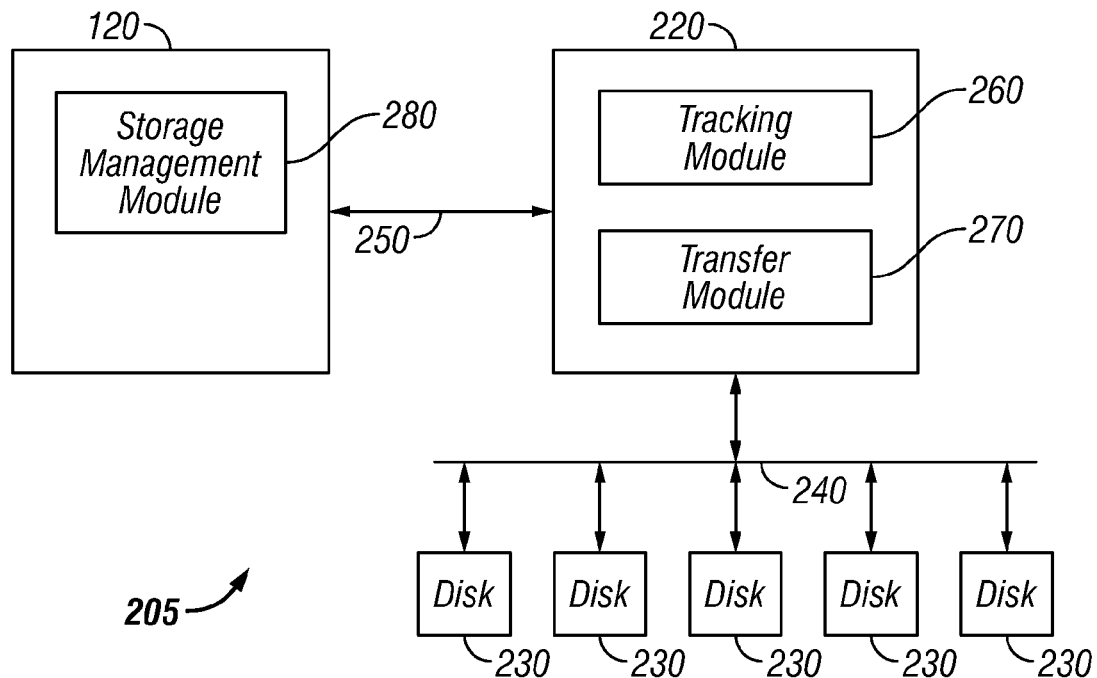
FIG. 2b is a block diagram illustrating an example fast replication compatible storage management system according to the present invention.

Referring to FIG. 2b, a fast replication compatible storage system 205 includes a fast replication capable controller 220, and a server or host 120 with a storage management module 280, and one or more storage devices 230.

The fast replication capable controller module 220 facilitates copying data from a source device to a target device in a manner that appears instantaneous. The controller 220 includes a transfer module 270 that enables the transfer of data between and within devices, and a tracking module 260 that tracks the movement and placement of the data. In one embodiment, the modules of the controller 220 are software modules configured to conduct their designated tasks.

In one embodiment, the modules of the controller 220 manage data within fixed-sized regions of storage on the storage devices 230 such as sectors, cylinders, or tracks. In certain embodiments, the devices 230 managed by the described modules of the controller 220 are logical devices or volumes, wherein the data is distributed across multiple physical devices in a redundant manner.

The transfer module 270 coordinates data transfers between source and target devices. In one embodiment, the transfer module 270 conducts handshaking with the storage devices 230 in a manner that validates the reliability of data transfers.

The tracking module 260 tracks the movement and placement of data involved in fast replication operations. In one embodiment, the tracking module 260 uses bit flags to mark and unmark regions containing data involved with fast replication operations. The bit flags enable reliable fast replication operations including fast replication withdraw operations.

According to the present invention, prior to withdrawing of fast replication relationships of a volume (either intentionally or inadvertently) which is being written to using a fast replication method, a fast replication query can be issued to tracks in which the volume table of contents (VTOC) resides. If the query determines that the tracks are active fast replication writes (i.e., a background copy is in progress), then the respective volume can be designated as unusable and later reformatted. Once the volume is reformatted, applications or programs that attempt to reference the volume and/or VTOC are not negatively affected.

Figure 3:
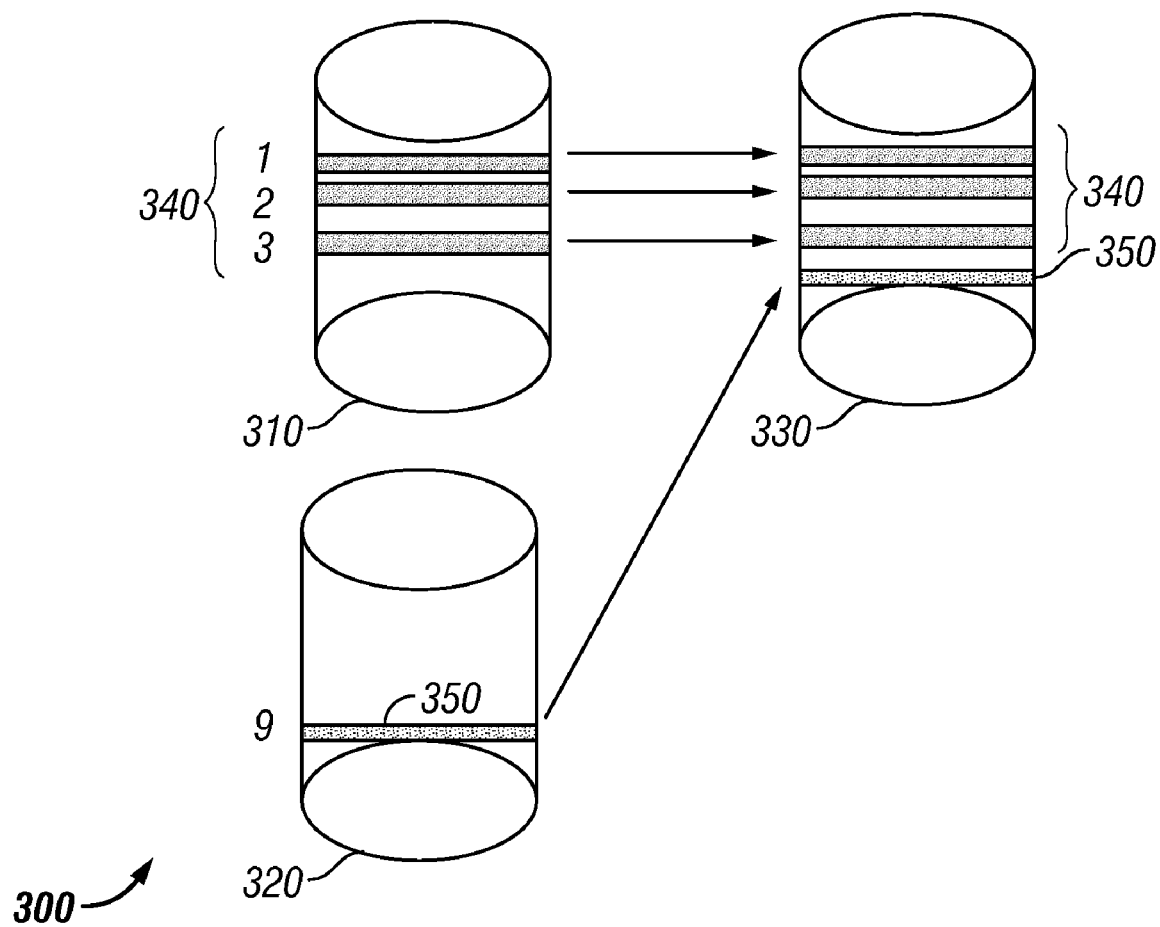
FIG. 3 is a conceptual illustration of how a first storage volume may be written to from differing storage volumes.

Referring to FIG. 3, a conceptual illustration 300 depicts how a storage volume 330 can be written to from differing volumes 310, 320. Writes 340 demonstrate that the writes 340 can exist separately from the writes 350 being made to the storage volume 330.

Existing convention does not distinguish between the two writes 340, 350 that are being made when one set of writes that are being performed includes most of the tracks (i.e., writes 340). Performing a fast replication query on the VTOC tracks serves to indicate whether all fast replication writes which are terminated will have a negative affect on the usability of a respective volume. If the writes 340 do not include VTOC tracks, then the write 350 can be preserved according to the present invention.

Figure 4A:
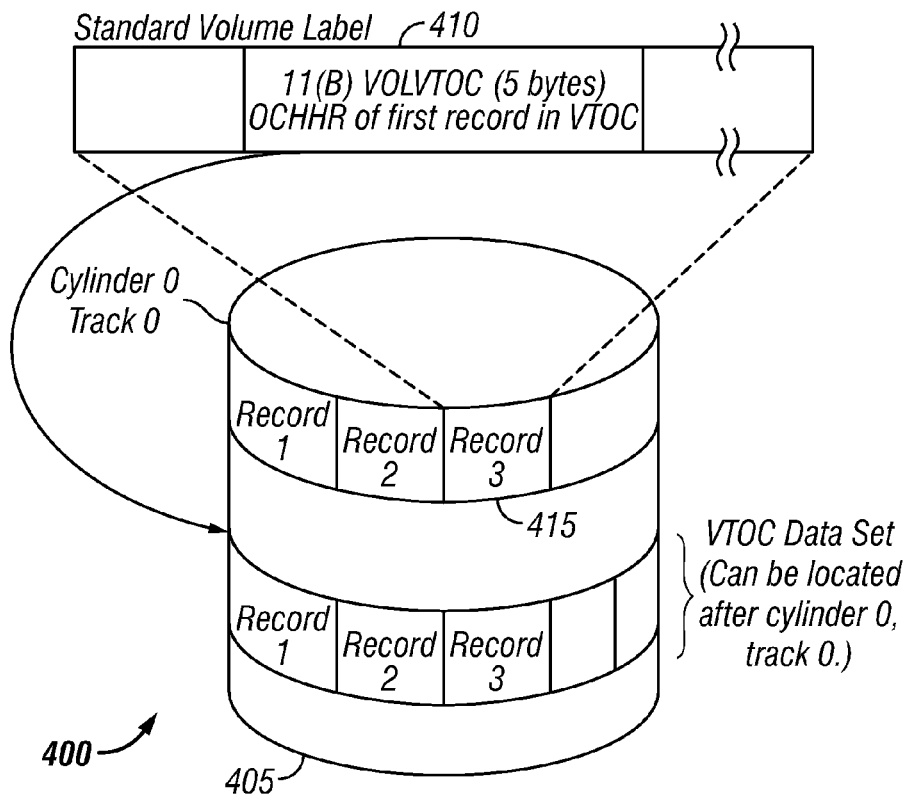
FIG. 4a is an illustration of a storage device having a volume table of contents (VTOC) and the location thereof.
Figure 4B:
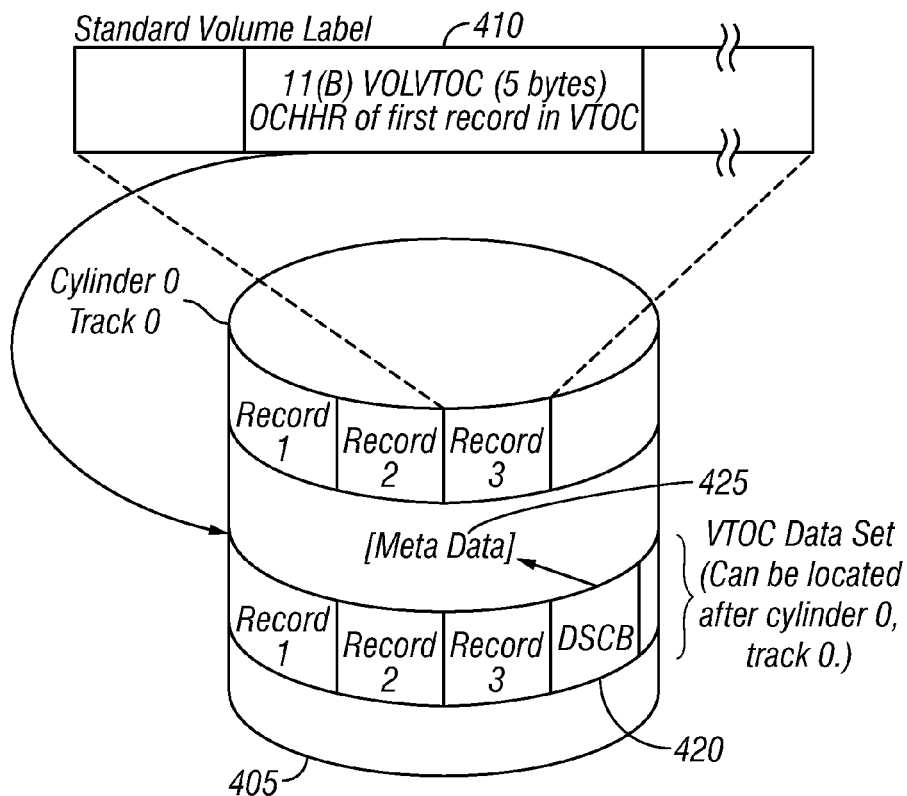
FIG. 4b illustrates a storage device including a data set control block (DSCB) pointing to metadata on the storage device.

FIG. 4a provides a conceptual illustration 400 of an example storage volume 405 having a series of records 415, incorporated into a respective track (e.g., Cylinder 0, Track 0) where a VTOC label is integrated into the record 415. As illustrated, the VTOC data set can be physically located anywhere on the volume 405. FIG. 4b conceptually illustrates volume 405 having an included data set control block (DSCB) record 420 which points to metadata on the volume 405. A fast replication query, according to the present invention, can evaluate the physical location of the VTOC to determine if a fast replication relationship exists.

If a fast replication query determines that metadata tracks on a storage device where a VTOC record points to, where a VTOC record can be a data set (e.g., DSCB, or any file that is referenced from a VTOC), is currently the target of a Flash-Copy relationship (physical background copy is taking place of metadata tracks), a method of reformatting could involve removing the VTOC record (removing the DSCB) (as opposed to reformatting the entire device). This method could be used when the VTOC tracks were already physically written but the actual metadata tracks have not been physically written.

Figure 5:
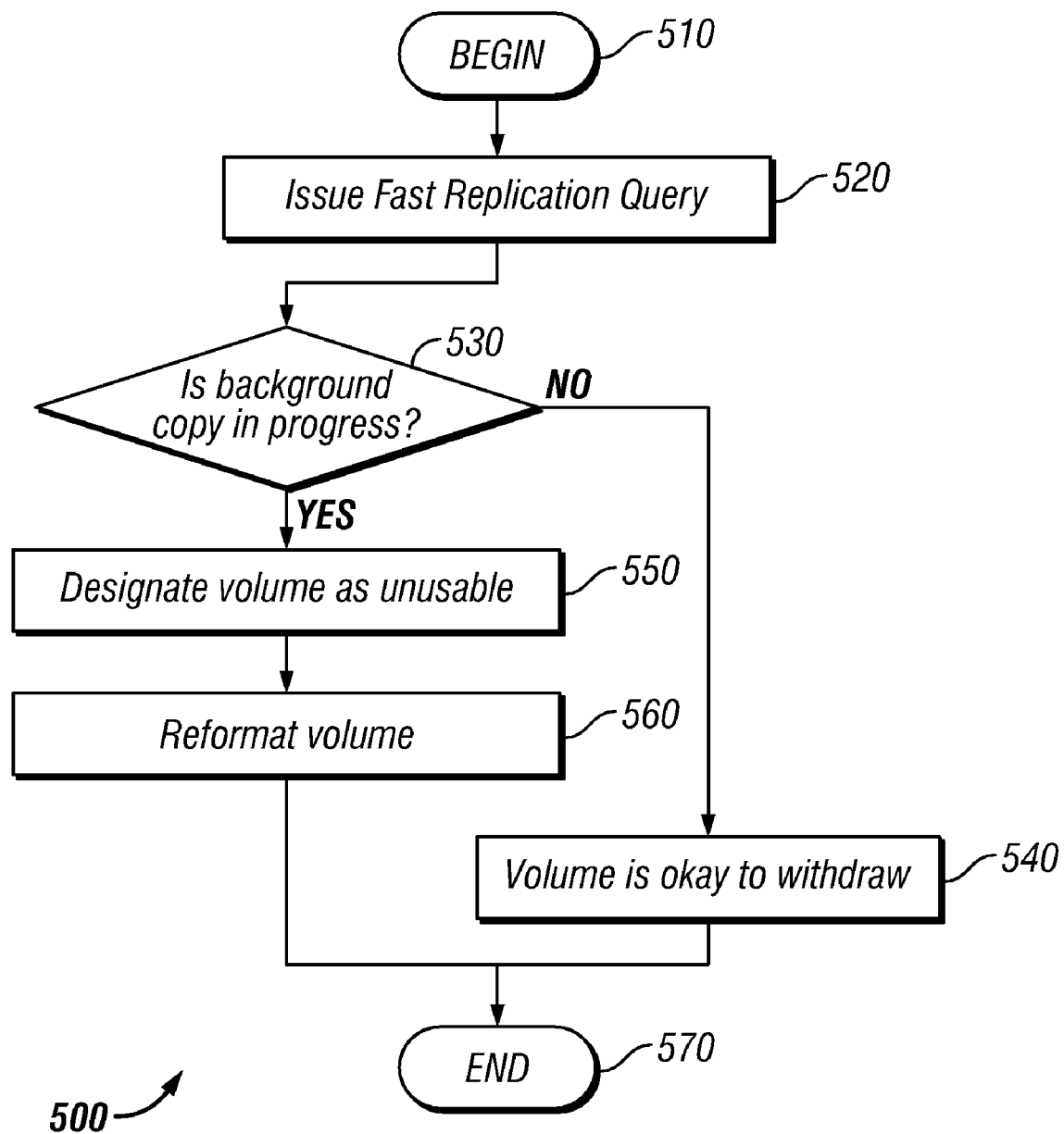
FIG. 5 illustrates a first example method of operation according to the present invention.

Turning to FIG. 5, a first example method 500 of operation according to the present invention, is depicted. In one embodiment, method 500 is performed prior to the intentional or inadvertent removal of a volume which is being written to in a fast replication method. Method 500 begins (step 510) by the issuance of a fast replication query (step 520) which can be performed by a controller such as a RAID controller or other processing device. Additionally, the controller can incorporate and execute software, or firmware to perform the issuance task.

As a next step, method 500 queries whether a background copy is in progress (step 530). If so, the respective volume at issue is designated as unusable (step 550). The volume can then be reformatted (step 560). Here as before, the entire device can be reformatted, or the removal of the VTOC record can be accomplished when VTOC tracks are already physically written but actual metadata tracks have not been physically written.

If it is determined that a background copy is not in progress (again, step 530), the respective volume is deemed safe to withdraw (step 540). Method 500 then ends (step 570).

Figure 6:
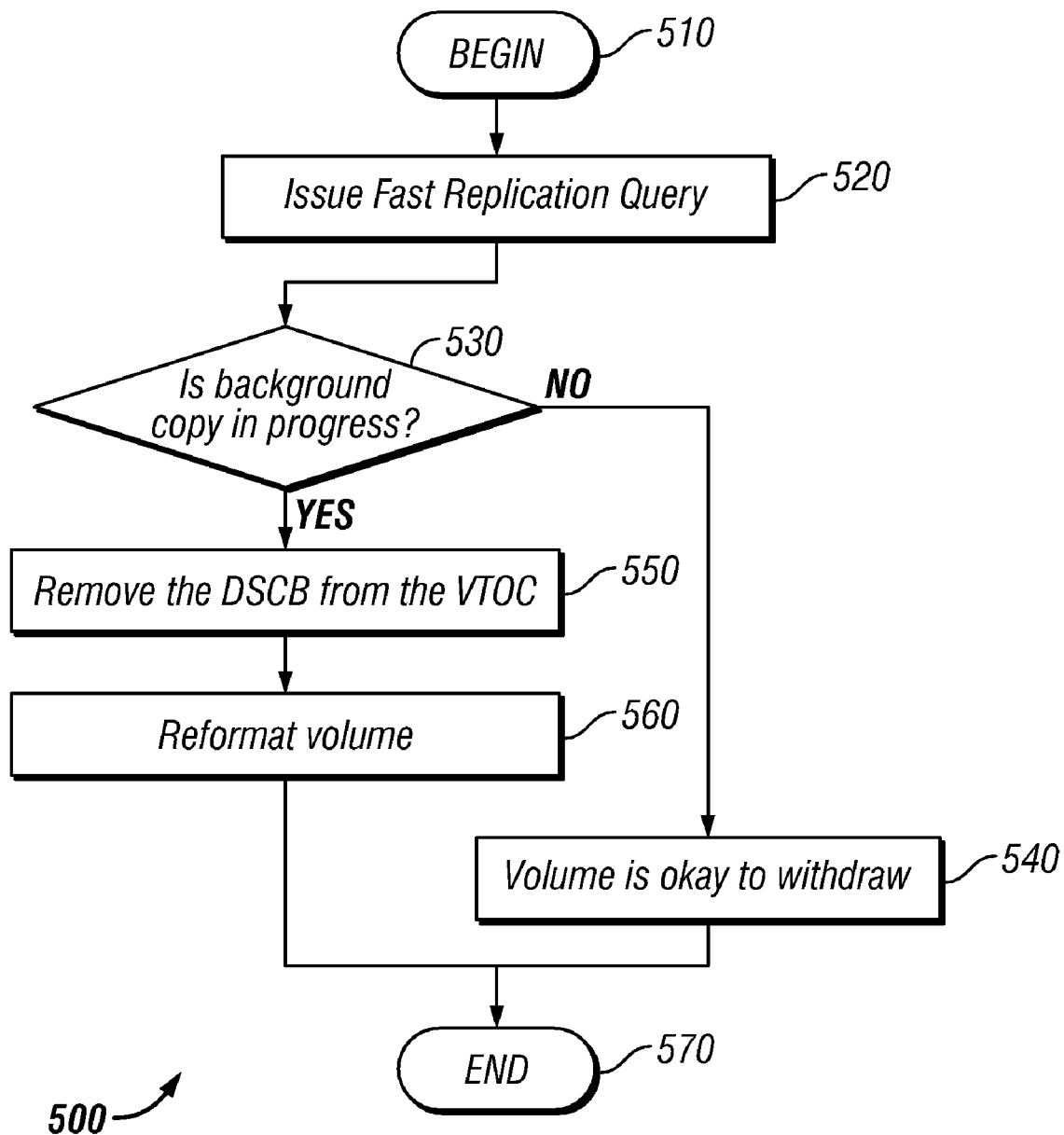
FIG. 6 illustrates a second example method of operation according to the present invention.

FIG. 6 illustrates a second example method of operation according to the present invention. Method 500 as shown includes the same steps as shown in FIG. 5, except that once the method 500 determines that a background copy is in progress (step 530), the respective DSCB is removed from the VTOC and the volume is essentially "quick" formatted (step 560) without the step of reformatting the entire device. If a background copy is not determined to be in progress, the volume is deemed safe to withdraw (again, step 540), and method 500 then ends (step 570).

An advantage of implementing the present invention is that one is able to subsequently reuse a respective volume at issue for any type of read or write activity without any type of negative implication due to the volume being placed in a completely usable state.

A further advantage is if the respective volume being written to using a fast replication method to an existing free space extent is not being written to, a subsequent fast replication write may want to be preserved and not be terminated by withdrawing and terminating all fast replication writes that are taking place. As a result, the efficiency of the storage system is maximized while the system and method resolves usability and accessibility issues associated with particular storage volumes.

Software and/or hardware to implement the method 500, or other functions previously described, such as the described issuance of a fast replication query, can be created using tools currently known in the art. The implementation of the described system and method involves no significant additional expenditure of resources or additional hardware than what is already in use in standard computing environments utilizing RAID storage topologies, which makes the implementation cost-effective.

Implementing and utilizing the example systems and methods as described can provide a simple, effective method of maintaining valid storage volumes as described, and serves to maximize the performance of the storage system. While one or more embodiments of the present invention have been illustrated in detail, the skilled artisan will appreciate that modifications and adaptations to those embodiments may be made without departing from the scope of the present invention as set forth in the following claims.

What is claimed is:

1. A method for maintaining a valid volume table of contents (VTOC) written to in a fast replication relationship, comprising:
   issuing a fast replication query to a track in which the volume table of contents (VTOC) resides to determine if removing the fast replication relationship involving a volume comprising the track would corrupt the volume by including invalid data in the VTOC;
   designating the volume as unusable if the fast replication query determines that a background copy involving the volume is in progress and removing the fast replication relationship would include invalid data in the VTOC; and
   withdrawing the volume if the fast replication query determines that the background copy is not in progress and removing the fast replication relationship would not include invalid data in the VTOC.

2. The method of claim 1, further including reformatting the volume to render the volume again usable if the background copy was in progress.

3. The method of claim 2, wherein reformatting the volume further includes removing a data set control block (DSCB) in lieu of reformatting the entire volume.

4. The method of claim 1, wherein issuing a fast replication query is performed by a redundant array of independent disks (RAID) controller.

5. The method of claim 1, wherein the invalid data is at least one entry in the VTOC.

6. The method of claim 5, wherein each entry is a pointer to an incorrect location.

7. An apparatus for maintaining a valid volume table of contents (VTOC) written to in a fast replication relationship, comprising:
   a processor configured to:
      issue a fast replication query to a track in which the volume table of contents (VTOC) resides to determine if removing the fast replication relationship involving a volume comprising the track would corrupt the volume by including invalid data in the VTOC,
      designate the volume as unusable if the fast replication query determines that a background copy involving the volume is in process and removing the fast replication relationship would include invalid data in the VTOC, and
      withdraw the volume if the fast replication query determines that the background copy is not in progress and removing the fast replication relationship would not include invalid data in the VTOC.

8. The apparatus of claim 7, wherein the processor further includes a redundant array of independent disks (RAID) controller device.

9. The apparatus of claim 8, wherein the RAID controller reformats the unusable volume.

10. The apparatus of claim 9, wherein reformatting the unusable volume further includes removing a data set control block (DSCB) in lieu of reformatting the entire volume.

11. The apparatus of claim 7, wherein the fast replication query is issued to the track through an interface connected to the processor.

12. The apparatus of claim 7, wherein issuing a fast replication query is performed using a combination of software or firmware operational on the processor.

13. The apparatus of claim 7, wherein the invalid data is at least one entry in the VTOC.

14. The apparatus of claim 13, wherein each entry is a pointer to an incorrect location.

15. An article of manufacture comprising a non-transitory storage medium including code for maintaining a valid volume table of contents (VTOC) written to in a fast replication relationship, wherein the code is capable of causing operations to be performed comprising:
   issuing a fast replication query to a track in which the volume table of contents (VTOC) resides to determine if removing the fast replication relationship involving a volume comprising the track would corrupt the volume by including invalid data in the VTOC;
   designating the volume as unusable if the fast replication query determines that a background copy involving the volume is in progress and removing the fast replication relationship would include invalid data; and
   withdrawing the volume if the fast replication query determines that the background copy is not in progress and removing the fast replication relationship would not include invalid data.

16. The article of manufacture of claim 15, further including code capable of reformatting the volume to render the volume again usable.

17. The article of manufacture of claim 16, wherein reformatting the volume further includes removing a data set control block (DSCB) in lieu of reformatting the entire volume.

18. The article of manufacture of claim 15, wherein issuing a fast replication query is performed using a redundant array of independent disks (RAID) controller.

19. The article of manufacture of claim 15, wherein the invalid data is at least one entry in the VTOC.

20. The article of manufacture of claim 19, wherein each entry is a pointer to an incorrect location.

* * * * *